United States Patent
Mashal et al.

(10) Patent No.: US 12,230,419 B1
(45) Date of Patent: Feb. 18, 2025

(54) CARBON NANOTUBE ULTRACONDUCTOR

(71) Applicant: HRL LABORATORIES, LLC, Malibu, CA (US)

(72) Inventors: Amirfarshad Mashal, Malibu, CA (US); Christopher P. Henry, Malibu, CA (US); David W. Shahan, Malibu, CA (US)

(73) Assignee: HRL LABORATORIES, LLC, Malibu, CA (US)

(*) Notice: Subject to any disclaimer, the term of this patent is extended or adjusted under 35 U.S.C. 154(b) by 287 days.

(21) Appl. No.: 17/811,456

(22) Filed: Jul. 8, 2022

Related U.S. Application Data (60) Provisional application No. 63/220,379, filed on Jul. 9, 2021.

(51) Int. Cl.
*H01B 1/04* (2006.01)
*B41J 2/14* (2006.01)
(Continued)

(52) U.S. Cl.
CPC ............ *H01B 12/06* (2013.01); *B41J 2/1433* (2013.01); *C01B 32/159* (2017.08); *C01B 32/174* (2017.08); *C09D 11/037* (2013.01); *C09D 11/322* (2013.01); *C09D 11/52* (2013.01); *H01B 1/04* (2013.01); *H01B 13/0036* (2013.01); *B82Y 30/00* (2013.01); *B82Y 40/00* (2013.01); *C01B 2202/02* (2013.01); *C01B 2202/08* (2013.01);
(Continued)

(58) Field of Classification Search
CPC ....... H01B 1/04; H01B 12/06; H01B 13/0036
See application file for complete search history.

(56) References Cited

U.S. PATENT DOCUMENTS

| 7,776,444 B2 | 8/2010 | Rinzler et al. |
| 8,071,906 B2 | 12/2011 | Smiljanic |

(Continued)

FOREIGN PATENT DOCUMENTS

| JP | 2009242145 A | 10/2009 |
| JP | 4971836 B2 | 7/2012 |

(Continued)

OTHER PUBLICATIONS

Abdulhamid, M. F., Basaran, C. & Lai, Y. S. Thermomigration versus electromigration in microelectronics solder joints. IEEE Trans. Adv. Pack 32(3), 627-635 (2009) (9 pages).

(Continued)

*Primary Examiner* — Jeremy C Norris
(74) *Attorney, Agent, or Firm* — WOMBLE BOND DICKSON (US) LLP (57) ABSTRACT

An ultraconductor includes: a base substrate; a carbon nanotube layer on the base substrate, the carbon nanotube layer including a plurality of carbon nanotubes; and an insulating layer on the carbon nanotube layer, wherein the plurality of carbon nanotubes are substantially all aligned along a longitudinal axis of the base substrate. A method of manufacturing the ultraconductor includes: preparing a base substrate; depositing a plurality of carbon nanotubes on the base substrate to form a carbon nanotube layer; depositing an insulating layer on the carbon nanotube layer, wherein the plurality of carbon nanotubes are substantially all aligned along a longitudinal axis of the base substrate.

24 Claims, 8 Drawing Sheets

(51) Int. Cl.

| | |
|---|---|
| *C01B 32/159* | (2017.01) |
| *C01B 32/174* | (2017.01) |
| *C09D 11/037* | (2014.01) |
| *C09D 11/322* | (2014.01) |
| *C09D 11/52* | (2014.01) |
| *H01B 12/06* | (2006.01) |
| *H01B 13/00* | (2006.01) |
| *B82Y 30/00* | (2011.01) |
| *B82Y 40/00* | (2011.01) |

(52) U.S. Cl.
CPC ...... *C01B 2202/22* (2013.01); *C01P 2004/03* (2013.01)

(56) References Cited

U.S. PATENT DOCUMENTS

| | | | |
|---|---|---|---|
| 8,245,393 B2 * | 8/2012 | Hong | H05K 3/207 29/850 |
| 8,354,593 B2 | 1/2013 | White et al. | |
| 8,445,788 B1 | 5/2013 | Tsotsis et al. | |
| 8,847,074 B2 | 9/2014 | Mann et al. | |
| 8,853,540 B2 | 10/2014 | Adriaenssens | |
| 9,396,829 B2 | 7/2016 | Mann et al. | |
| 10,074,819 B2 | 9/2018 | Arnold et al. | |
| 2007/0036978 A1 | 2/2007 | Chen | |
| 2012/0045385 A1 | 2/2012 | Lashmore et al. | |
| 2012/0045643 A1 | 2/2012 | Liu et al. | |
| 2012/0045644 A1 | 2/2012 | Wei et al. | |
| 2012/0118552 A1 | 5/2012 | White et al. | |
| 2013/0105195 A1 | 5/2013 | Adriaenssens | |

FOREIGN PATENT DOCUMENTS

| | | |
|---|---|---|
| JP | 5146256 B2 | 2/2013 |
| TW | 1379316 B | 12/2012 |
| WO | WO 2013/034672 A2 | 3/2013 |
| WO | WO 2013/109442 A1 | 7/2013 |
| WO | WO 2013/127444 A1 | 9/2013 |

OTHER PUBLICATIONS

Ascend, "Aviation-class Synergistically Cooled Electric-motors with iNtegrated Drives", ARPA-E RFI (DE-FOA-0002534) Jun. 2021; https://arpa-e.energy.gov/technologies/programs/ascend (2 pages).

Black, J. R. Electromigration failure modes in aluminum metallization for semiconductor devices. P. IEEE 57(9), 1587-1594 (1969) (14 pages).

Collins, P. G., Hersam, M., Arnold, M., Martel, R. & Avouris, P.h. Current saturation and electrical breakdown in multiwalled carbon nanotubes, Physical Review Letters 86(14), 3128-3131 (2001) (4 pages).

Dammel et al., "*Diazonaphthoquinone-based Resists*," SPIE Press (1993); https://www.google.com/books/edition/Diazonaphthoquinone_based_Resists/X3Uel1nb7hoC?hl=en&gbpv=1&dq=Dammel%20et%20al.%20%20%E2%80%9CDiazonaphthoquinone-based%20Resists%2C%E2%80%9D%20SPIE%20Press%20(1993)&pg=PP6&printsec=frontcover (TOC, 3 pages).

Frank, S., Poncharal, P., Wang, Z. L. & de Heer, W. A. Carbon nanotube quantum resistors. Science 280, 1744-1746 (1998) (4 pages).

Futaba, D. N. et al. Shape-engineerable and highly densely packed single-walled carbon nanotubes and their application as supercapacitor electrodes. Nat. Mater. 5, 987-994 (2006) (8 pages).

Hummel, R. E. & Geier, H. J. Activation energy for electrotransport in thin silver and gold films. Thin Solid Films 25, 335-342 (1975) (8 pages).

Huntington, H. B. & Grone, A. R. Current induced marker motion in gold wires. J. Phys. Chem. Solids 20, 76-87 (1961) (12 pages).

Jinkins et al., Scalable Alignment of Carbon Nanotubes via Shear, ECS Transactions 93(1) 117-120 (2019) (5 pages).

Jones et al., "*Synthesis, characterization and applications of core-shell carbone-hexagonal boron nitride nanotubes*," Nanoscale Advances (2020), vol. 2, 4996-5014.

Joo, Y. et al. Dose-Controlled, Floating Evaporative Self-assembly and Alignment of Semiconducting CNTs from Organic Solvents. Langmuir 30 (12), 3460-3466 (2014) (7 pages).

Kim, Tae sung et al. Development of carbon nanotube/copper composite yarn by electrodeposition and evaluation of ampacity. JSME (2017) (13 pages).

Kim et al. Ultrastrong Graphene-Copper Core-Shell Wires for High-Performance Electrical Cables ACS Nano 2018 12 (3), 2803-2808 (6 pages).

Li, P.- C. & Young, T. K. Electromigration: the time bomb in deep-submicron ICs. IEEE Spectrum 33, 75-78 (1996) (4 pages).

Lloyd, J. R. Electromigration failure. J. Appl. Phys. 69(11), 7601-7604 (1991) (5 pages).

Lloyd, J. R. & Clement, J. J. Electromigration in copper conductors. Thin Solid Films 262, 135-141 (1995) (7 pages).

Lloyd, J. R., Clemens, J. & Snede, R. Copper metallization reliability. Microelectron. Reliab. 39, 1595-1602 (1999) (16 pages).

Mashal et al., "*Polarizing Raman Imaging of Large Area Aligned Semiconducting Singled- Walled Carbon Nanotubes*," Journal of Raman Spectroscopy (2020), vol. 51: 390-397 (17 pages).

Miao et al. Electrical conductivity of pure carbon nanotube yarns. Carbon, vol. 49, Issue 12, pp. 3755-3761 (2011) (7 pages).

Murali, R., Yang, Y., Brenner, K., Beck, T. & Meindl, J. D. Breakdown current density of graphene nanoribbons. Appl. Phys. Lett. 94, 2431143 (2009) (3 pages).

Naeemi, A. & Meindl, J. D. Compact physical models for multiwall carbon nanotube interconnects. IEEE Electr. Device L. 27, 338-341 (2006) (3 pages).

Oliver, K. G. Basic Industrial Electricity: A Training and Maintenance Manual Ch. 3 (Industrial Press Inc., New York, 1990); (TOC, 1 page) https://www.google.com/books/edition/Basic_Industrial_Electricity/grl_sNGEOiIC?hi=en&gbpv=1&dq=Oliver%20%20K.%20G.%20Basic%20Industrial%20Electricity%3A%20A%20Training%20and%20Maintenance%20Manual&pq=PA358&printsec=frontcover.

Park et al. Electron-phonon scattering in metallic single-walled carbon nanotubes. Nano. Lett. 4, 517-520 (2004) (4 pages).

Preece, W. H. On the heating effects of electric current. P. R. Soc. London 464-471 (1884). (8 pages).

Sangwan, V. K. et al., "*Fundamental Performance Limits of Carbon Nanotube Thin-Film Transistors Achieved Using Hybrid Molecular Dielectrics*," ACS Nano (2012), 6(8), 7480-7488 (9 pages).

Subramaniam et al. One hundred fold increase in current carrying capacity in a carbon nanotube-copper composite. Nat. Commun. 4:2202 doi: 10.1038/ncomms3202 (2013) (7 pages).

Tao, J. & Cheung, N. W. Electromigration characteristics of copper interconnects. IEEE Electr. Device L. 14, 249-251 (1993) (3 pages).

Tkalya et al., "*The use of surfactants for dispersing carbon nanotubes and graphene to make conductive nanocomposites*," Colloid & Interface Science (2012), vol. 17, 225-232 (8 pages).

Wang, L. et al. Graphene-copper composite with micro-layered grains and ultrahigh strength. *Sci. Rep.* 7, 41896; doi: 10.1038/srep41896 (2017) (10 pages).

Wei, B. Q., Vajtai, R. & Ajayan, P. M. Reliability and current carrying capacity of carbon nanotubes. Appl. Phys. Lett. 79, 1172-1174 (2001) (4 pages).

Yao, Z., Kane, C. L. & Dekker, C. High-field electrical transport in single-wall carbon nanotubes. Phys. Rev. Lett. 84(13), 2941-2944 (2000) (4 pages).

Yoon, M. S. et al. In-situ observation of electromigration in eutectic SnPb solder lines: atomic migration and hillock formation. J. Electron. Mater 36(5), 562-567 (2007) (6 pages).

\* cited by examiner

CARBON NANOTUBE ULTRACONDUCTOR

CROSS-REFERENCE TO RELATED APPLICATION(S)

The present application claims priority to and the benefit of U.S. Provisional Application No. 63/220,379, filed Jul. 9, 2021, the entire content of which is incorporated herein by reference.

BACKGROUND

1. Field

Aspects of embodiments of the present disclosure relate generally to an ultraconductor including carbon nanotubes and methods of fabricating the ultraconductor.

2. Description of Related Art

Copper is one of the most versatile and commonly used electrical wiring materials. A combination of copper's high electrical and thermal conductivity, high tensile strength, and its resistance to corrosion make it highly desirable for various electrical conductor applications. However, copper also possess certain limitations that can lead to power losses. In particular, copper conductors have limited performance in higher temperature applications, such as, for example, electrical aircraft motors and electrical vehicle (EV) motors. At higher temperatures (e.g., temperatures higher than or equal to 175° C.) such as those that may be observed in EV motors, Joule heating (or resistive loss) may reduce copper's conductivity by up to 57%. Copper is further limited by its current carrying capacity (CCC), which determines an amount of current (amperage) a conductor can carry before it melts from the heat that is generated by the passing current. In addition, electromigration can negatively affect copper conductors, especially in high current/high temperature applications.

Today, best-in-class motors and inverters have a combined power density of 3-4 KW/kg. ARPA-E has determined that for a Boeing 737 to complete a typical five-hour flight, the propulsion system must be >12 kW/kg continuous.

To date, there has been no adequate industrial or research grade solution for fabricating an electrical wire that has both improved CCC and conductivity at high temperature applications (e.g., >150° C.).

Accordingly, there is a need in the industry for improved conductors that overcome copper's limitations in thermal loss, CCC, etc., while maintaining the desirable electrical and mechanical properties of copper wires.

SUMMARY

Aspects of embodiments of the present application are directed toward a ultraconductor comprising carbon nanotubes and toward methods of fabricating the same.

Additional aspects will be set forth in part in the description which follows and, in part, will be apparent from the description, or may be learned by practice of the presented embodiments of the disclosure.

In one or more embodiments, an ultraconductor may include: a base substrate; a carbon nanotube layer on the base substrate, the carbon nanotube layer including a plurality of carbon nanotubes; and an insulating layer on the carbon nanotube layer, wherein the plurality of carbon nanotubes are substantially all aligned along a longitudinal axis of the base substrate.

In one or more embodiments, at least 70% of the plurality of carbon nanotubes of the carbon nanotube layer may be aligned along the longitudinal axis of the base substrate.

In one or more embodiments, the base substrate may include a conductive material selected from the group consisting of copper (Cu), aluminum (Al), silver (Ag), gold (Au), a glass-coated conductive metal, and combinations thereof.

For example, the base substrate may be a copper (Cu) wire.

The base substrate may include an insulating material.

In one or more embodiments, a surface of the base substrate may include a hydrophobic coating selected from the group consisting of hexamethyldisilazane (HMDS), phosphates, GTUB3, and combinations thereof.

In one or more embodiments, the base substrate may have a textured surface.

In one or more embodiments, the plurality of carbon nanotubes may include at least 95% of metallic carbon nanotubes.

In one or more embodiments, the plurality of carbon nanotubes may consist of metallic carbon nanotubes.

In one or more embodiments, the plurality of carbon nanotubes may include 90% to 99% of single-wall carbon nanotubes.

In one or more embodiments, the plurality of carbon nanotubes may consist of single-wall carbon nanotubes.

In one or more embodiments, the plurality of carbon nanotubes may be modified with metal nanoparticles.

In one or more embodiments, the carbon nanotube layer may further include a surfactant.

In one or more embodiments, the insulating layer may include a thermally conductive electrically insulating material.

In one or more embodiments, the insulating layer may include hexagonal boron nitride (hBN).

In one or more embodiments, hBN may be crystallographically intertwined with a lattice of the carbon nanotube layer.

In one or more embodiments, the base substrate, the carbon nanotube layer, and the insulating layer may be concentric.

In one or more embodiments, a method of manufacturing an ultraconductor may include: preparing a base substrate; depositing a plurality of carbon nanotubes on the base substrate to form a carbon nanotube layer; and depositing an insulating layer on the carbon nanotube layer, wherein the plurality of carbon nanotubes are substantially all aligned along a longitudinal axis of the base substrate.

In one or more embodiments, the preparing of the base substrate may include surface-treating the base substrate with a hydrophobic coating, surface texturing the base substrate, or a combination thereof.

In one or more embodiments, the depositing the plurality of carbon nanotubes may include: sorting a carbon nanotube network to separate metallic single-wall carbon nanotubes, such that the plurality of carbon nanotubes comprises at least 95% of metallic carbon nanotubes and 90% to 99% of single-wall carbon nanotubes; dispersing the plurality of carbon nanotubes in a solution comprising a solvent and a surfactant; and aligning the plurality of carbon nanotubes on the base substrate, such that at least 70% of carbon nanotubes among the plurality of carbon nanotubes are aligned along the longitudinal axis of the base substrate.

In one or more embodiments, the depositing the plurality of carbon nanotubes may further include: modifying the plurality of carbon nanotubes with metal nanoparticles; and subjecting the plurality of carbon nanotubes to annealing.

In one or more embodiments, the depositing the insulating layer may include thermal spray coating, chemical vapor deposition, and/or the like of hexagonal boron nitride (hBN)

In one or more embodiments, an apparatus for manufacturing an ultraconductor may include: a stock roll comprising a base substrate and configured to be unrolled into at least one spread-out portion; inkjet nozzles above the at least one spread-out portion of the stock roll, the inkjet nozzles configured to deposit a solution on the at least one spread-out portion; a heat source under the at least one spread-out portion of the stock roll; and an analyzer.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Hereinafter, example embodiments will be described in more detail with reference to the accompanying drawings, in which like reference numbers refer to like elements throughout. The subject matter of the present disclosure, however, may be embodied in various different forms, and should not be construed as being limited to only the illustrated and described embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions may be stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As explained above, at higher temperatures (e.g., temperatures higher than or equal to 175° C.) such as those that may be observed in EV motors, Joule heating (or resistive loss) may reduce a related art metal conduct's (e.g., copper's) conductivity. The metal may be further limited by its current carrying capacity (CCC) and/or electromigration.

Aspects of embodiments of the present disclosure are directed toward a method for fabricating an electrical conductor that has both improved CCC and conductivity at high temperature applications (e.g., >150° C.). The conductor should overcome related art conductor's limitations in thermal loss, CCC, etc., while maintaining the desirable electrical and mechanical properties of related art conductor (e.g., copper).

One or more embodiments of the present disclosure are directed towards a carbon nanotube (CNT)-based ultraconductor with significantly improved current carrying capacity and conductivity, as compared with conventional copper wirings.

One or more embodiments of the present disclosure are directed toward an ultraconductor that includes a base substrate, a carbon nanotube layer on the base substrate, and an insulating layer on the carbon nanotube layer.

Carbon nanotubes are cylindrical molecules that consist of rolled-up sheets of single-layer carbon atoms (e.g., graphene). Single-wall carbon nanotube represents a single sheet of graphene (having a hexagonal carbon-atom lattice) rolled up to form a hollow cylinder. CNTs are chemically bonded with hybridized $sp^2$ bonds, which are an extremely strong form of molecular interaction. CNTs also have a natural inclination to rope together via van der Waals forces, and nested together single-wall nanotubes form multi-wall carbon nanotubes bound together by van der Waals interactions in a tree ring-like structure. Single-wall carbon nanotubes can have diameters (e.g., diameter distribution range) of less than 1 nm, and multi-wall nanotubes can have diameters (e.g., diameter distribution range) as large as 100 nm. As used herein, diameter of a nanotube is defined as an average distance between the nuclei of carbon atoms at opposite ends of a tube diameter, as measured using transmission electron microscopy (TEM).

CNTs may have relatively small diameters in nanometer scale, and high aspect ratio (>1000), thus resulting in a relatively large surface area.

Suitable carbon nanotubes can have average diameters in the range of about 1 to 4 nanometers.

In one or more embodiments, carbon nanotubes can have lengths in the range of about 300 nanometers to 5 microns.

The rolling-up direction (or chiral vector) of the graphene layers determines the electrical properties of the CNTs. Chirality describes the angle of the nanotube's hexagonal carbon-atom lattice, and chiral nanotubes have non-superimposable mirror images. The conductivity of single-wall carbon nanotubes (SWCNTs) depends on their chiral vector-they can behave like a metal and be electrically conducting; display the properties of a semi-conductor; or be non-conducting.

Chirality of a given nanotube is indicated by chiral indices n and m, where a nanotube is chiral if m>0 and m≠n, and is achiral if n=m. Achiral SWCNTs in which n=m are metallic and are highly conductive. In particular, the current carrying capacity (CCC) of metallic nanotubes is more than 1,000 times greater than that of copper.

The ultraconductor of the present embodiments will be described in more detail with reference to FIG. 1.

Figure 1:
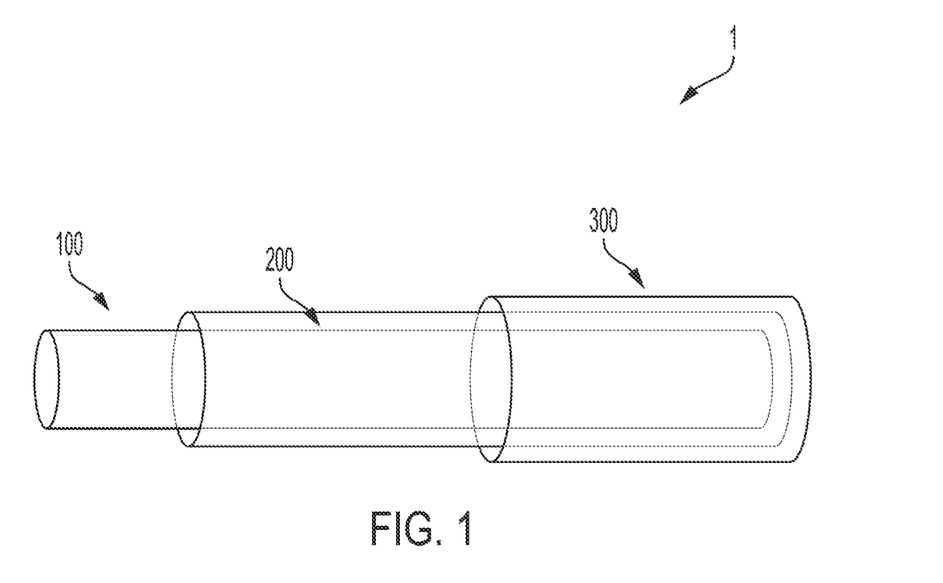
FIG. 1 is a schematic view of an ultraconductor according to one or more embodiments of the present disclosure.

As shown in FIG. 1, the ultraconductor 1 may include a base substrate 100, a carbon nanotube layer 200 on the base substrate 100, and an insulating layer 300 on the carbon nanotube layer 200. In the embodiments of FIG. 1, the base substrate 100, the carbon nanotube layer 200, and the insulating layer 300 have circular cross-sections and are concentric, but embodiments of the present disclosure are not limited thereto.

The base substrate 100 may be formed of a conductive material such as, for example, copper (Cu), aluminum (Al), gold (Au) and/or silver (Ag). In one or more embodiments, the base substrate 100 may be a glass wire (e.g., a glass-coated conductive metal). However, embodiments of the present disclosure are not limited thereto, and any suitable conductive material may be utilized.

In one or more other embodiments, the base substrate 100 may be formed of an insulating material such as, for example, SiOx, glass, silica, aluminum oxide, borosilicate, a dielectric material, etc. When the base substrate is formed of an insulating material, rather than a conductive material, a current may be directed to go primarily through the carbon nanotube coating, thus reducing a possible mismatch at an interface between the base substrate 100 and the carbon nanotube layer 200 that may cause an electron slowdown and a potential decrease in conductivity.

In one or more embodiments, the base substrate 100 may have an elongated, cylindrical, parallelepiped, and/or rod-like shape, but embodiments of the present disclosure are not limited thereto. In one or more other embodiments, the base substrate 100 may have any shape suitable for application as an electrical conductor. For example, the base substrate 100 may be a cylindrical wire or a square wire.

Length and/or diameter of the base substrate 100 are not particularly limited so long as the base substrate 100 is suitable for manufacture of the ultraconductor of the present embodiments.

In one or more embodiments, the base substrate 100 may be a copper (Cu) wire.

In one or more other embodiments, the base substrate 100 may be a wafer having a "flat shape."

The base substrate 100 may be surface treated prior to being coated with the carbon nanotubes. The surface treating of the base substrate 100 may improve adhesion of the CNTs to the base substrate 100. For example, the base substrate 100 may be coated with a hydrophobic coating. Because CNTs are hydrophobic, and the base substrate may have a hydrophilic surface, increasing hydrophobicity of the base substrate 100 may increase the adhesion of the CNTs to the base substrate. Examples of the hydrophobic coating may include hexamethyldisilazane (HMDS), suitable phosphate compounds, GTUB3, etc. When the hydrophobic coating is coated on the base substrate 100, a contact angle on the surface of the base substrate 100 may increase, and the surface energy of the base substrate 100 may decrease. See e.g., Dammel et al., "*Diazonaphthoquinone-based Resists*," SPIE Press (1993) incorporated herein in its entirety be reference.

In one or more embodiments, the base substrate 100 may be subject to surface texturing, to obtain a textured surface of the base substrate 100 and improve adhesion of the CNTs to the base substrate 100. For example, the surface texturing may be formed by utilizing sandpaper, laser, plasma nitriding processing, etc.

A carbon nanotube layer 200 comprising a plurality of carbon nanotubes may be provided on the base substrate 100.

The present disclosure is not limited to any one method by which to produce carbon nanotubes. Rather, any suitable method can be used to produce carbon nanotubes for use in conjunction with methods and apparatus of this disclosure. For example, CNTs can be synthesized using chemical vapor deposition (CVD), laser ablation, arc discharge, enzymatic synthesis, or any other suitable technique.

Further, any suitable size of carbon nanotube can be used. Carbon nanotube length and diameter can affect the electronic properties of the nanotubes. Therefore, the carbon nanotube size can be selected to optimize performance and based on desired properties of the carbon nanotubes.

In one or more embodiments, the carbon nanotubes may be sorted to obtain a desired or suitable kind of carbon nanotubes. Because batch-produced CNTs contain a mixture of CNTs with varying characteristics, sorting is needed to separate nanotubes that will have the desired physical and/or electrical properties. For example, a batch of CNTs may include a mixture of single-wall and multi-wall carbon nanotubes. The batch of CNTs may also include a mixture of metallic and semiconducting nanotubes with various chiralities. Such random networks of CNTs may have suboptimal electronic properties.

According to one or more embodiments, a batch of CNTs may be selectively sorted to obtain metallic single-wall carbon nanotubes (m-SWCNTs), which may be separated from the rest of the carbon nanotubes in the batch.

According to one or more embodiments of the present disclosure, the carbon nanotube layer 200 may include single-wall carbon nanotubes as a major component. For example, the carbon nanotube layer 200 may include 50 to 100%, 60 to 100%, 70 to 100%, 80 to 100%, or 90 to 99% of SWCNTs. In one or more embodiments, the carbon nanotube layer 200 may include 99% of single-wall carbon nanotubes.

According to one or more embodiments, the carbon nanotube layer 200 may include of metallic carbon nanotubes as a major component. For example, the carbon nanotube layer 200 may include 50 to 100%, 60 to 100%, 70 to 100%, 80 to 100%, 90 to 99%, or 95 to 98% of metallic carbon nanotubes. For example, the carbon nanotube layer 200 may include 95%, 98%, or 99% of metallic carbon nanotubes.

In one or more embodiments, the CNTs may be sorted (e.g., separated) via density differentiation. For example, the nanotubes may be separated by the density difference using centrifugation. During centrifugation, carbon nanotubes may be sorted by their buoyancy, with certain carbon nanotubes being more buoyant (e.g., having a lower density) than other nanotubes. As a result, carbon nanotubes with different buoyancies can be separated from one another. Various physical and electronic properties of the carbon nanotubes including, without limitation, their diameter, bandgap and/or electronic type (e.g., metallic vs. semiconducting) may affect their buoyant densities. When subjected to centrifugation, the carbon nanotubes may be separated according to the differences in their buoyant densities.

For example, single-walled CNTs (SWCNTs) may have smaller diameters than multi-walled CNTs (MWCNTs), and CNTs with smaller diameters may exhibit lower buoyant density. As SWCNTs with smaller diameters tend to be more buoyant than MWCNTs with larger diameters, SWCNTs may be separated from the MWCNTs using centrifugation.

The centrifugation method may further utilize one or more various suitable co-surfactants to enhance the selectivity of carbon nanotubes with a specific chirality. The introduction of a co-surfactant may help engineer subtle differences in the buoyant densities of differently structured carbon nanotubes, and thus help separate chiral semiconducting carbon nanotubes from achiral metallic nanotubes. Examples of co-surfactants may include, but are not limited to, sodium dodecyl-sulfate (SDS), and sodium cholate (SC). However, any co-surfactant suitable for centrifugation of carbon nanotubes may be utilized.

The centrifugation method may utilize any suitable centrifuge apparatus in the art. For example, a centrifuge with a swinging-bucket centrifuge rotor may be utilized, but embodiments of the present disclosure are not limited thereto. For example, the centrifugation method may be density gradient ultracentrifugation (DGU).

However, embodiments of the present disclosure are not limited thereto, and the sorting for the carbon nanotubes of the present embodiments may be performed by any suitable method in the art. For example, electrophoresis, chromatography, biphasic extraction, selective solubilization and/or selective reaction methods may be utilized.

The carbon nanotubes may be dispersed in a solution, also referred to herein as "CNT ink." Dispersion of CNTs in a solution helps separate and spread out individual CNTs, and reduces their agglomeration (e.g., clumping together). As such, the resulting CNT solution may be suitably applied to the base substrate 100.

The CNT ink may refer to a solution containing at least CNTs and a solvent. In one or more embodiments, the CNTs may be pre-sorted and may contain primarily m-SWCNTs, but embodiments of the present disclosure are not limited thereto. Any suitable concentration of CNTs in the CNT ink may be utilized. For example, the concentration of CNTs in the CNT ink may be 2 mg/mL.

The solvent may be an organic solvent suitable for dispersion of CNTs. For example, the solvent may be a material that is vaporized or volatilized at room temperature or with heat. In one or more embodiments, the solvent may be a volatile material with a low boiling point, such as, for example, chloroform ($CHCl_3$) and/or sulfuric acid ($H_2SO_4$). However, embodiments of the present disclosure are not limited thereto, and the solvent may be, for example, acetone, water, alcohol, toluene, propylene glycol (PG), propylene glycol methyl acetate (PGMA), and/or the like.

In one or more embodiments, the CNT ink may further include a dispersing agent. For example, the dispersing agent may be a surfactant. The surfactant may reduce hydrophobicity of CNTs and may improve adhesion of CNTs to the base substrate 100. For example, the surfactant may have a lipid chain with a polar head that may bond to the carbon nanotube surface.

Figure 2:
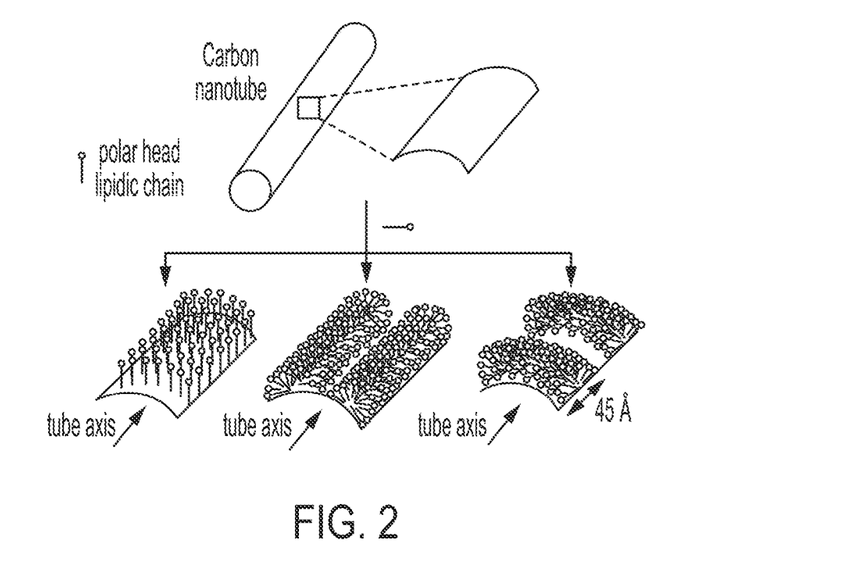
FIG. 2 is a schematic view illustrating attachment of a surfactant to carbon nanotubes in the ultraconductor according to one or more embodiments of the present disclosure.

In one or more embodiments, as shown in FIG. 2, the surfactant may be bonded to the carbon nanotube surface in a substantially uniform arrangement. In other one or more embodiments, the lipid chains of the surfactant may be grouped together in sections that extend in one direction and are arranged with each other in another direction, crossing the one direction. For example, the one direction in which the surfactant sections may extend may be a longitudinal (e.g., tube) axis of the nanotube, or it may be a direction crossing the longitudinal (e.g., tube) axis of the nanotube. See e.g., Tkalya et al., "*The use of surfactants for dispersing carbon nanotubes and graphene to make conductive nanocomposites*," Colloid & Interface Science (2012), vol. 17, 225-232, incorporated herein in its entirety by reference.

In one or more embodiments, the surfactant may comprise an anionic surfactant, a cationic surfactant, a zwitterionic surfactant, a nonionic surfactant, or a combination thereof. The anionic surfactant may include, for example, sulfonate derivative, phosphate derivative, sulfate derivative, carboxylate derivative, and/or the like. For example, the anionic surfactant may be sodium dodecyl sulfate (SDS) and/or sodium dodecylbenzenesulfonate (NaDDBS). The cationic surfactant may include, for example, an amine derivative, a quaternary ammonium salt derivative, and/or the like. For example, the cationic surfactant may include alkyl ammonium chloride. The zwitterionic surfactant may include, for example, both positive and negative charged groups as listed above. For example, the positive charged group may be an amine derivative and/or a quaternary ammonium cation. For example, the negative charged group may be a sulfonate derivative, phosphate derivative, sulfate derivative, and/or carboxylate derivative. For example, the zwitterionic surfactant may include alkyl betaine. The nonionic surfactant may include, for example, ethoxylate derivative, fatty alcohol ethoxylate derivative, alkylphenol ethoxylate derivative, fatty acid ethoxylate derivative, ethoxylated amine derivative, fatty acid amine derivative, terminally blocked ethoxylate derivative, fatty acid esters of polyhydroxy compounds, fatty acid esters of glycerol, fatty acid esters of sorbitol, and/or the like. For example, the nonionic surfactant may be Triton X-100. However, embodiments of the present disclosure are not limited thereto and any suitable dispersing agent and/or surfactant may be utilized.

In one or more embodiments, the CNT solution may further include a binding agent. Examples of the binding agent may include carboxymethyl cellulose, xantham gum, PVP, etc.

In one or more embodiments, the CNT solution may further include a non-CNT carbon-based ink. For example, the solution may include graphite and/or graphene. The graphitic embodiment (e.g., graphite and/or graphene flakes) in the ink may further improve adherence of the CNTs to the base substrate 100, and/or assist with (or improve) dispersion of CNTs in the CNT solution.

In one or more embodiments, the CNTs may be dispersed in a solution utilizing ultrasonication. For example, the CNT solution may be placed into an ice water bath, and may be sonicated for about 30 minutes utilizing a horn tip sonicator at 50% power (e.g., 75 W at sample), but embodiments of the present disclosure are not limited thereto.

In one or more embodiments, the CNTs may be subjected to defect functionalization. For example, the sidewalls of the nanotubes may contain defects that may be intrinsic, or may be the result of various processes performed on the carbon nanotubes, including the processes of growing and sorting the nanotubes, dispersing them in solvents, etc., without limitation.

Figure 3:
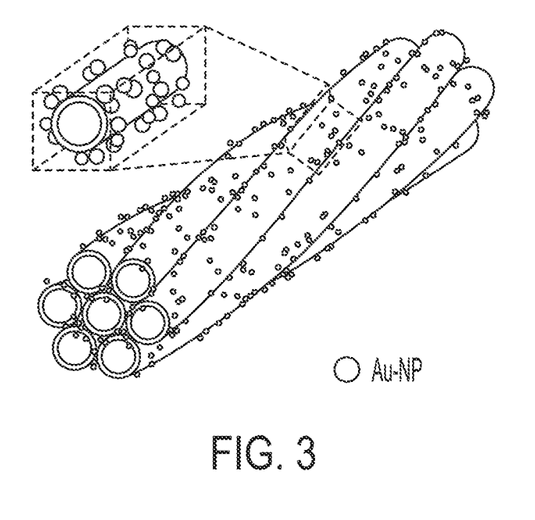
FIG. 3 is a schematic view illustrating gold nanoparticles bonded to carbon nanotubes in the ultraconductor according to one or more embodiments of the present disclosure.
Figure 4A:
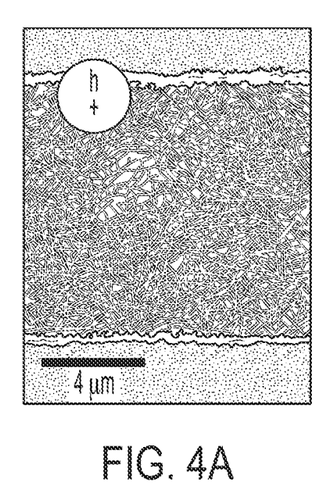
FIGS. 4A-4D are SEM images of carbon nanotube arrangements according to one or more embodiments of the present disclosure.
Figure 4B:
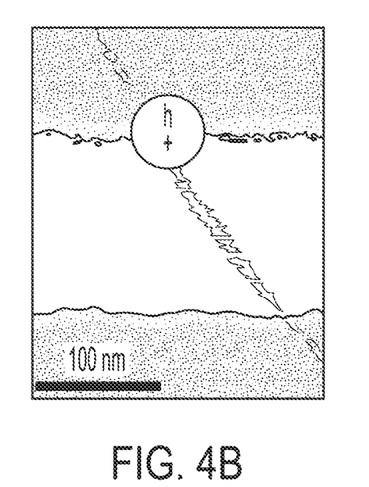
Figure 4C:
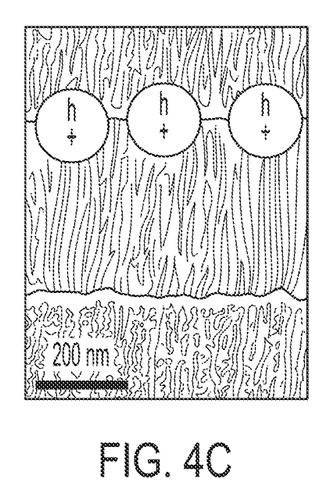
Figure 4D:
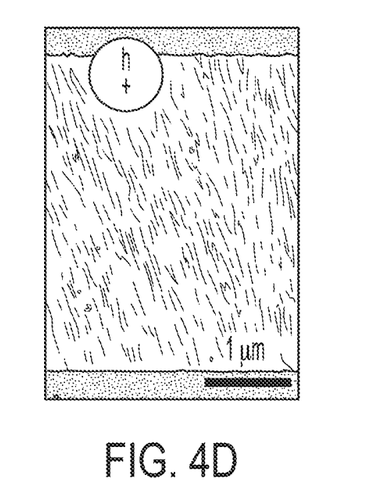

In one or more embodiments, defect functionalization of the carbon nanotubes may be performed by utilizing metal nanoparticles such as, for example, gold nanoparticles (Au-NP). The metal nanoparticles may be bonded to the CNTs by utilizing one or more suitable methods in the art, for example, by physical deposition and/or wet chemical deposition. For example, the nanoparticles can be directly attached to the CNTs by physical absorption, or they may be chemically linked together to form a suitably stable structure. For example, the metal nanoparticles may be covalently bonded to the sidewalls of the carbon nanotubes. In one or more embodiments, as shown in FIG. 3, gold nanoparticles may be bonded to the sidewalls of the carbon nanotubes in substantially a single layer. In one or more embodiments, the metal nanoparticle-decorated CNTs may be subjected to heat treatment to remove impurities and promote bonding.

In one or more embodiments, thermal annealing may be utilized to strengthen CNTs, treat certain defects, and further improve CNT-to-CNT conductivity. For example, the annealing (e.g., the heating of the carbon nanotubes) may be performed by utilizing a laser. In one or more other embodiments, the annealing may be performed in a quartz tube furnace in an environment of a forming gas and methane mixed at 95:5 ratio.

In one or more embodiments, the carbon nanotubes dispersed in a solution may be aligned on the base substrate 100 to form the carbon nanotube layer 200. Aligned CNTs may refer to CNTs that are arranged parallel (or substantially parallel) to other CNTs in the network. CNTs may also be aligned parallel (or substantially parallel) to a longitudinal axis of the base substrate 100 on which the CNTs are (or will be) positioned. As with sorting of the CNTs, aligning CNTs further improves their properties, including improved electrical conductivity and current carrying capacity.

FIGS. 4A-4D show SEM images of (A) a random network of CNTs, (B) an isolated CNT, (C) an aligned array of CNTs on a 200 nm scale, and (D) a scaled aligned array of CNTs on a 1 μm scale. See Sangwan, V. K. et al., "*Fundamental Performance Limits of Carbon Nanotube Thin-Film Transistors Achieved Using Hybrid Molecular Dielectrics*," ACS Nano (2012), vol 6, 7480-7488, incorporated herein in its entirety by reference.

In one or more embodiments, the CNTs of the present disclosure may be aligned by a method of shear alignment. For example, the alignment of the CNTs may be done mechanically. For example, the alignment may be done by floating evaporative self-assembly (FESA). In this technique, a receiving substrate is withdrawn from a container filled with liquid (e.g., a water trough) at set or predetermined position and velocity. Single doses of CNT ink are delivered to the substrates in controlled aliquots (e.g., droplets of a set or predetermined volume). Each aliquot of ink is dropped onto the trough surface in the vicinity of the substrate (e.g., at the interface of the substrate), and then spreads across the surface to the substrate to form an aligned carbon nanotube stripe. The substrate may be a wafer. The CNT ink may be deposited via one or more suitable methods, including, without limitation, syringe pump and/or jet nozzles. When using jet nozzles, the arrangement of the jet nozzles may suitably vary depending on the shape of the substrate. For example, for a cylindrical substrate, a circular nozzle arrangement may be utilized to deliver the CNT ink. However, embodiments of the present disclosure are not limited thereto, and a linear arrangement of the jet nozzles may be utilized for a cylindrical substrate.

The withdrawal (e.g., pulling up) of the substrate may be performed by any suitable method. For example, an upright mechanical stage may be utilized. The mechanical stage may be positioned upright and normal (e.g., substantially perpendicular) to the surface of the liquid-filled container. The mechanical stage may be an xy mechanical stage, and when positioned upright, may move left to right and up and down. The withdrawal (or pulling up) of the sample may be performed with the mechanical stage moving up and away from the surface of the liquid. However, embodiments of the present disclosure are not limited thereto. For example, the withdrawal of the sample may be performed manually (e.g., by hand).

Figure 5:
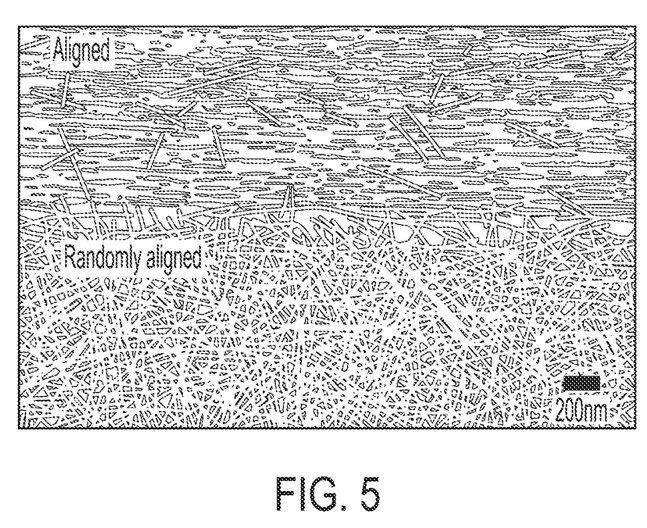
FIG. 5 is an SEM image of carbon nanotube network according to one or more embodiments of the present disclosure.

The width and density of the CNTs within each aligned stripe may be controlled by the velocity of the substrate. The result may be a substrate with aligned arrays of CNTs as shown in, for example, FIG. 5. In FIG. 5, the bottom portion shows a jumbled network of not-aligned CNTs, and the top portion shows an aligned array of CNTs fabricated using the floating evaporative self-assembly (FESA) method. See e.g., Joo et al., "*Dose-Controlled, Floating Evaporative Self-Assembly and Alignment of Semiconducting Carbon Nanotubes from Organic Solvents*," Langmuir (2014), vol. 30, 3460-3466, and U.S. Pat. No. 10,074,819, each incorporated herein in its entirety by reference.

In one or more embodiments, the carbon nanotubes may be substantially aligned in the carbon nanotube layer 200. For example, 70% or more of carbon nanotubes in the carbon nanotube layer 200 may be aligned. For example, 75% or more of carbon nanotubes in the carbon nanotube layer 200 may be aligned.

The degree of alignment of the carbon nanotubes and/or carbon nanotube density may be evaluated by utilizing polarized Raman spectroscopy and polarized Raman imaging.

In the polarized Raman spectroscopy method, a polarized Raman signal reaches a peak intensity when the long axis of a carbon nanotube film is in phase or parallel with the incident laser polarization. When the sample is rotated out of phase with this alignment, the signal intensity reduces until it reaches a minimum intensity at ±90° from the peak signal intensity. From the minimum signal at 90° and maximum signal intensity at 0°, "optical anisotropy" may be calculated by dividing the peak Raman intensity by the minimum Raman intensity while applying a normalization and correction factor to account for optics and sample variance, respectively.

In the polarized Raman imaging, the polarized Raman spectra from each individual point are converted it to a pixel value (depending on which band is isolated), and an image is formulated from it. One Raman image is collected with a vertically polarized incident laser and vertical analyzer orientation (VV) aligned in parallel to the CNT long axis, which yields the strongest Raman peak intensity. A second Raman image is collected with a horizontally polarized incident laser and horizontal analyzer orientation (HH), with the alignment remaining the same and no rotation of the sample, which produces the weakest Raman peak. When conglomerated, these values form an optical anisotropy image may be utilized to determine the quality of the alignment in a CNT film. See also, Mashal et al., "*Polarizing Raman Imaging of Large Area Aligned Semiconducting Singled-Walled Carbon Nanotubes*," Journal of Raman Spectroscopy (2020), vol. 51:390-397, incorporated herein in its entirety by reference.

In one or more embodiments, alignment (e.g., shear alignment) of the CNTs (e.g., of m-SWCNTs) promotes adhesion between individual CNTs, as well as adhesion of the CNTs to the base substrate 100. For example, the aligned CNTs may have improved axial and lateral adhesion to the base substrate 100. As used herein, axial adhesion may refer to adhesion along the extension direction (e.g., along longitudinal direction) of the base substrate 100, and lateral adhesion may refer to adhesion along a direction normal (or substantially perpendicular) to the extension direction of the base substrate 100.

In one or more embodiments, the aligned array of CNTs may be provided on the base substrate 100 to form the carbon nanotube layer 200.

The insulating layer 300 may be provided on the carbon nanotube layer 200. The insulating layer 300 may be electrically insulating. The insulating layer 300 may also be thermally conductive. Accordingly, the insulating layer may reduce the risk of a short circuit, while also facilitating the dissipation of heat. When copper (e.g., copper wire of the base substrate 100) heats up, electrical conductivity may decrease. However, a thermally conductive insulating layer 300 may help dissipate heat and reduce or prevent the decrease in conductivity of the wire.

In one or more embodiments, the insulating layer 300 may be formed of a suitable material that is thermally conductive and electrically insulating. For example, the insulating layer 300 may include hexagonal boron nitride (hBN), polymers such as liquid crystalline polymer and/or polyimide, etc. In one or more embodiments, the insulating layer 300 may be formed of hBN.

The insulating layer 300 may be formed by one or more suitable methods in the art. For example, the insulating layer 300 may be formed by spray coating, thermal spray coating, dip coating, chemical vapor deposition, and/or the like, without limitation. The insulating layer 300 may be a single layer or a plurality of layers.

In one or more embodiments, the insulating layer 300 may be an hBN layer, and hBN may crystallographically intertwine with CNT lattice. For example, carbon atoms in the crystal lattice of the carbon nanotubes may be interlocked and/or interconnected with atoms in the crystal lattice of hexagonal boron nitride, which is isostructural to graphene from which CNTs are formed. For example, the hBN layer may surround (e.g., wrap or wrap around) individual CNTs and/or a plurality of CNTs may (e.g., further) be wrapped with the hBN layer. However, embodiments of the present disclosure are not limited thereto. See also, Jones et al., "Synthesis, characterization and applications of core-shell carbone-hexagonal boron nitride nanotubes," Nanoscale Advances (2020), vol. 2, 4996-5014, incorporated herein in its entirety be reference.

Figure 6:
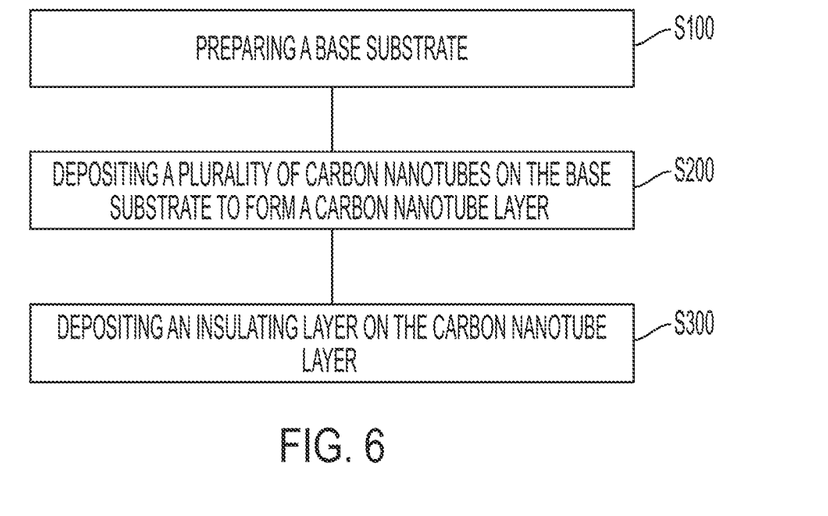
FIG. 6 is a flowchart of a method of manufacturing an ultraconductor according to one or more embodiments of the present disclosure.

A method of manufacturing an ultraconductor according to embodiments of the present disclosure will now be described in more detail with reference to FIG. 6. As shown in FIG. 6, the method may include preparing a base substrate 100 (S100); depositing a plurality of carbon nanotubes on the base substrate 100 to form a carbon nanotube layer 200 (S200); and depositing an insulating layer 300 on the carbon nanotube layer 200 (S300).

Figure 7:
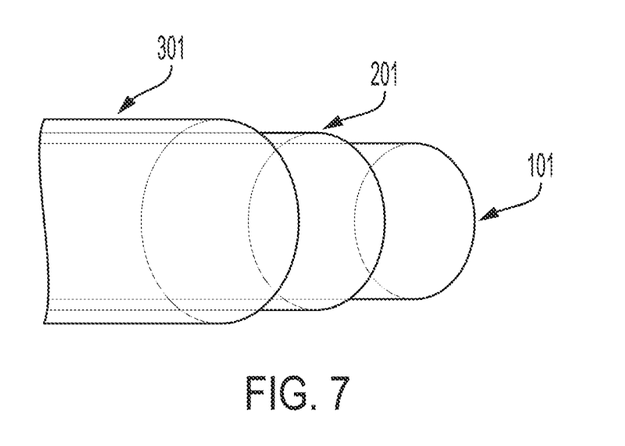
FIG. 7 is a schematic view of an ultraconductor according to one or more other embodiments of the present disclosure.

In one or more other embodiments, and as shown in FIG. 7, an ultraconductor may have an aligned CNT core 101, a conductive layer 201 on the aligned CNT core 101, and an insulating layer 301 on the conductive layer 201. For example, the aligned CNT core 101 may be formed of metallic single-wall carbon nanotubes, the conductive layer 201 may be formed of copper, and the insulating layer 301 may be hBN, but embodiments of the present disclosure are not limited there.

Figure 8:
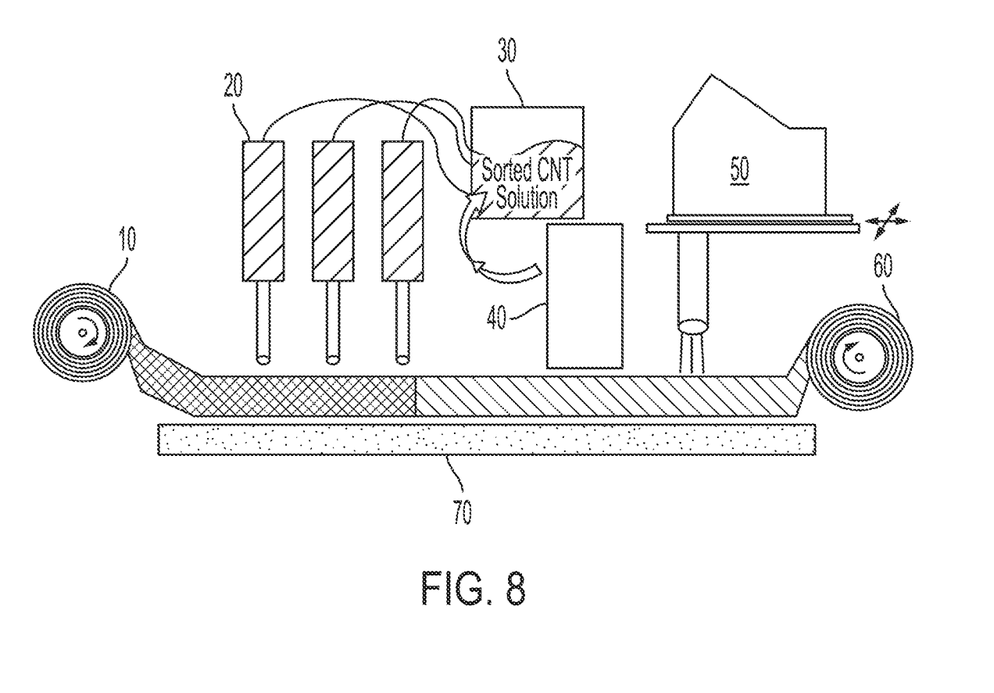
FIG. 8 is a schematic view of an apparatus for manufacturing an ultraconductor according to one or more embodiments of the present disclosure.

FIG. 8 is a schematic view of an apparatus for manufacturing the carbon nanotube ultraconductor according to the present embodiments. In some embodiments, the apparatus may be utilized for large scale production of the carbon nanotube ultraconductor.

In one or more embodiments, the apparatus may include a stock roll 10. For example, the stock roll 10 may include the material forming the base substrate 100. In one or more embodiments, the stock roll 10 may be a copper wire, without limitation. The stock roll 10 may be wound on a center wheel by any suitable method. In the apparatus, the stock roll 10 may be gradually unrolled to be partially spread out, and then rolled back into a finished roll 60. As one section of the stock roll 10 gets processed and rolled into the finished roll 60, subsequent section of the stock roll 10 gets spread out for processing.

The apparatus may further include inkjet nozzles 20 above the partially spread out section of the stock roll 10. The inkjet nozzles 20 may deposit a solution 30 on the spread-out section of the stock roll 10. For example, the solution 30 may be the CNT ink of the present embodiments, but is not limited thereto. For example, the solution 30 may include sorted m-SWCNTs, but is not limited thereto. Here, the apparatus may include a sorter 40. The sorter 40 may be, for example, a centrifuge.

The inkjet nozzles 20 may be arranged in any suitable formation, for example, in a linear formation, a circular formation, or a random formation. Any suitable formation of the inkjet nozzles 20 may be selected, depending on the characteristics of the material included in the stock roll 10. Further, although FIG. 8 shows three nozzles 20, the number of nozzles 20 may suitably vary and may be selected according to the characteristics of the stock roll material, coating solution, etc.

The apparatus may further include an analyzer 50 to analyze and evaluate the coated roll. For example, the analyzer 50 may be a Raman spectrometer, but embodiments of the present disclosure are not limited thereto. When the analyzer 50 is a Raman spectrometer, the degree of alignment of the carbon nanotubes on the stock roll 10 may be evaluated. Although FIG. 8 shows one analyzer 50, embodiments of the present disclosure are not limited thereto. For example, more than one analyzer 50 may be present, and the plurality of analyzers 50 may be the same as or different from each other.

The apparatus may further include a heat source 70 provided under the spread-out portion of the stock roll 10. The heat source 70 may facilitate the drying of the solution 30 that was coated on the spread-out portion of the stock roll 10. Any suitable heat mechanism may be utilized as the heat source. For example, the heat source may be a hot plate. In one or more embodiments, the heat source may include, without limitation, a quartz tube furnace and/or laser (e.g., a laser annealing apparatus).

The spread-out portion of the stock roll 10 that has been coated with the solution 30, dried utilizing the heat source 70, and analyzed utilizing the analyzer 50, may be rolled up into the finished roll 60. By utilizing the apparatus according to the present embodiments, large scale production of the ultraconductor according to the present embodiments may be implemented.

The ultraconductor according to the present embodiments may have more than 1000 times higher current carrying capacity, and up to 10 times higher conductivity, than copper. Furthermore, carbon nanotubes of the present ultraconductor should not succumb to the same Joule heating losses, skin effect, and/or electromigration issues that may degrade comparable copper conductors. Accordingly, the utilization of the ultraconductor according to the present embodiments may result in significant weight reductions as compared to comparable conductors in the art, improved performance and durability, particularly in high power and high temperature electronic applications.

Indeed, reducing Joule heating losses, reducing overall weight, increasing conductivity, and increasing current carrying capacity all directly enhance EV motor performance and range, and may lead to significant improvements in conductivity at operational EV motor temperatures.

The ultraconductor of the present embodiments may be utilized in various electrified transportation applications, including electric vehicles (EV), electric vertical take-off and landing (eVTOL) aircrafts, and/or the like, and may lead to significant weight reduction and boost in performance.

Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures.

Additionally, as used herein, the term "substantially," "about," and similar terms are used as terms of approximation and not as terms of degree, and are intended to account for the inherent deviations in measured or calculated values that would be recognized by those of ordinary skill in the art.

The tasks described above may be performed in the order described or in any other suitable sequence. Additionally, the methods described above are not limited to the tasks described. Instead, for each embodiment, one or more of the tasks described above may be absent and/or additional tasks may be performed.

Furthermore, as used herein, when a component is referred to as being "on" another component, it can be directly on the other component or components may also be present therebetween.

Moreover, when a component is component is referred to as being "coupled" to another component, it can be directly attached to the other component or intervening components may be present therebetween.

As used herein, the term "major component" refers to a component that is present in a composition, polymer, or product in an amount greater than an amount of any other single component in the composition or product. In contrast, the term "primary component" refers to a component that makes up at least 50% (wt % or at %) or more of the composition, polymer, or product.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. An ultraconductor comprising:
   a base substrate;
   a carbon nanotube layer on the base substrate, the carbon nanotube layer comprising a plurality of carbon nanotubes; and
   an insulating layer on the carbon nanotube layer,
   wherein the plurality of carbon nanotubes comprise 50% to 100% of metallic carbon nanotubes, and the plurality of carbon nanotubes are substantially all aligned along a longitudinal axis of the base substrate.

2. The ultraconductor of claim 1, wherein at least 70% of the plurality of carbon nanotubes of the carbon nanotube layer are aligned along the longitudinal axis of the base substrate.

3. The ultraconductor of claim 1, wherein the base substrate comprises a conductive material selected from the group consisting of copper (Cu), aluminum (Al), silver (Ag), gold (Au), a glass-coated conductive metal, and combinations thereof.

4. The ultraconductor of claim 1, wherein the base substrate is a copper (Cu) wire.

5. The ultraconductor of claim 1, wherein the base substrate comprises an insulating material.

6. The ultraconductor of claim 1, wherein a surface of the base substrate comprises a hydrophobic coating selected from the group consisting of hexamethyldisilazane (HMDS), phosphates, GTUB3, and combinations thereof.

7. The ultraconductor of claim 1, wherein the base substrate has a textured surface.

8. The ultraconductor of claim 1, wherein the plurality of carbon nanotubes comprise at least 95% of metallic carbon nanotubes.

9. The ultraconductor of claim 1, wherein the plurality of carbon nanotubes consist of metallic carbon nanotubes.

10. The ultraconductor of claim 1, wherein the plurality of carbon nanotubes comprise 90% to 99% of single-wall carbon nanotubes.

11. The ultraconductor of claim 1, wherein the plurality of carbon nanotubes consist of single-wall carbon nanotubes.

12. The ultraconductor of claim 1, wherein the plurality of carbon nanotubes are modified with metal nanoparticles.

13. The ultraconductor of claim 1, wherein the carbon nanotube layer further comprises a surfactant.

14. The ultraconductor of claim 1, wherein the insulating layer comprises a thermally conductive electrically insulating material.

15. The ultraconductor of claim 1, wherein the insulating layer comprises hexagonal boron nitride (hBN).

16. The ultraconductor of claim 15, wherein hBN is crystallographically intertwined with a lattice of the carbon nanotube layer.

17. The ultraconductor of claim 1, wherein the base substrate, the carbon nanotube layer, and the insulating layer are concentric.

18. A method of manufacturing an ultraconductor, the method comprising:
    preparing a base substrate;
    depositing a plurality of carbon nanotubes on the base substrate to form a carbon nanotube layer; and
    depositing an insulating layer on the carbon nanotube layer,
    wherein the plurality of carbon nanotubes comprise 50% to 100% of metallic carbon nanotubes, and the plurality of carbon nanotubes are substantially all aligned along a longitudinal axis of the base substrate.

19. The method of claim 18, wherein the preparing of the base substrate comprises surface-treating the base substrate with a hydrophobic coating, surface texturing the base substrate, or a combination thereof.

20. The method of claim 18, wherein the depositing the plurality of carbon nanotubes comprises:
    sorting a carbon nanotube network to separate metallic single-wall carbon nanotubes, such that the plurality of carbon nanotubes comprises at least 95% of metallic carbon nanotubes and 90% to 99% of single-wall carbon nanotubes;
    dispersing the plurality of carbon nanotubes in a solution comprising a solvent and a surfactant; and
    aligning the plurality of carbon nanotubes on the base substrate, such that at least 70% of carbon nanotubes among the plurality of carbon nanotubes are aligned along the longitudinal axis of the base substrate.

21. The method of claim 18, wherein the depositing the plurality of carbon nanotubes further comprises:
    modifying the plurality of carbon nanotubes with metal nanoparticles; and
    subjecting the plurality of carbon nanotubes to annealing.

22. The method of claim 18, wherein the depositing the insulating layer comprises thermal spray coating, chemical vapor deposition, and/or the like of hexagonal boron nitride (hBN).

23. An apparatus for manufacturing an ultraconductor, the apparatus comprising:
    a stock roll comprising a base substrate and configured to be unrolled into at least one spread-out portion;
    inkjet nozzles above the at least one spread-out portion of the stock roll, the inkjet nozzles configured to deposit a solution on the at least one spread-out portion;
    a heat source under the at least one spread-out portion of the stock roll; and
    an analyzer.

24. An ultraconductor comprising:
    a base substrate;
    a carbon nanotube layer on the base substrate, the carbon nanotube layer comprising a plurality of carbon nanotubes; and an insulating layer on the carbon nanotube layer,
wherein the plurality of carbon nanotubes are substantially all aligned along a longitudinal axis of the base substrate, and
wherein:
the base substrate is a copper (Cu) wire; and/or
a surface of the base substrate comprises a hydrophobic coating selected from the group consisting of hexamethyldisilazane (HMDS), phosphates, GTUB3, and combinations thereof; and/or
the insulating layer comprises hexagonal boron nitride (hBN); and/or
the base substrate, the carbon nanotube layer, and the insulating layer are concentric.

* * * * *